United States Patent
Feng et al.

(10) Patent No.: US 11,868,935 B2
(45) Date of Patent: Jan. 9, 2024

(54) SYSTEM AND METHOD FOR ALLOCATING COMPUTER-BASED RESOURCES BASED ON INCOMPLETE POLICY DATA

(71) Applicant: YotaScale, Inc., Menlo Park, CA (US)

(72) Inventors: Jinyu Feng, Mountain View, CA (US); Haotian Xu, Los Angeles, CA (US)

(73) Assignee: YOTASCALE, INC., Menlo Park, CA (US)

( * ) Notice: Subject to any disclaimer, the term of this patent is extended or adjusted under 35 U.S.C. 154(b) by 0 days.

(21) Appl. No.: 17/070,375

(22) Filed: Oct. 14, 2020

(65) Prior Publication Data

US 2021/0182756 A1 Jun. 17, 2021

Related U.S. Application Data

(60) Provisional application No. 62/914,730, filed on Oct. 14, 2019.

(51) Int. Cl.
| | |
|---|---|
| *G06Q 10/06* | (2023.01) |
| *G06Q 10/0631* | (2023.01) |
| *G06N 5/04* | (2023.01) |
| *G06N 20/00* | (2019.01) |
| *G06Q 10/105* | (2023.01) |
| *G06Q 10/10* | (2023.01) |

(52) U.S. Cl.
CPC ......... *G06Q 10/06315* (2013.01); *G06N 5/04* (2013.01); *G06N 20/00* (2019.01); *G06Q 10/06312* (2013.01); *G06Q 10/103* (2013.01); *G06Q 10/105* (2013.01)

(58) Field of Classification Search
CPC ......................................... G06Q 10/00–90/00
See application file for complete search history.

(56) References Cited

U.S. PATENT DOCUMENTS

| | | | |
|---|---|---|---|
| 2002/0120744 A1* | 8/2002 | Chellis | G06F 9/50 709/226 |
| 2004/0261081 A1* | 12/2004 | Sen | G06F 11/3466 719/313 |
| 2009/0089325 A1* | 4/2009 | Bradford | H04L 41/147 |
| 2010/0262695 A1* | 10/2010 | Mays | G06F 9/5027 709/226 |
| 2019/0294473 A1* | 9/2019 | Martin | G06F 9/5027 |

\* cited by examiner

*Primary Examiner* — Arif Ullah
(74) *Attorney, Agent, or Firm* — Lloyd & Mousilli (57) ABSTRACT

A system and method for allocating computer resources. The method includes generating a resource allocation policy defined for an organization for allocating the computer resources, determining a resource category allocation based on the generated resource allocation policy, generating a usage data, allocating the computer resource based on at least one of the generated usage data or the determined resource category allocation, executing allocation engines to allocate remaining unallocated computer resources, and providing a predicted resource allocation to implement the allocating of the computer resource.

15 Claims, 8 Drawing Sheets

SYSTEM AND METHOD FOR ALLOCATING COMPUTER-BASED RESOURCES BASED ON INCOMPLETE POLICY DATA

CROSS-REFERENCE TO RELATED APPLICATIONS

This application claims the benefit of U.S. Provisional Application No. 62/914,730 filed on Oct. 14, 2019, the contents of which are hereby incorporated by reference.

TECHNICAL FIELD

The present disclosure relates generally to a system and method of allocating computer resources. More specifically, the present disclosure is directed to a system and method of allocating computer resources based on incomplete policy data.

BACKGROUND

As entities increase their usage on cloud-based computer-based resources, such as processing time and/or storage space, entities have faced increasing difficulties in determining how to allocate costs associated with the usage of these computer-based resources. In many instances, resources may be utilized by joint-teams within an organization, such that resource usage cannot be easily attributed to one particular team (having an associated budget). Moreover, teams (and budgets) may be highly transient in nature, such that a single team (and budget) may be formed to complete a discrete task requiring the usage of computer-based resources before those resources may be properly allocated to the transient team's budget.

Through applied effort and ingenuity, various embodiments discussed herein have solved many of the challenges associated with allocating computer-based resource usage among a plurality of potential recipients.

In view of the discussion herein, there is a need for a system and device that can allocate computer resources, particularly when the policy data is incomplete.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for allocating computer resources. The method includes generating a resource allocation policy defined for an organization for allocating the computer resources, determining a resource category allocation based on the generated resource allocation policy, generating a usage data, allocating the computer resource based on at least one of the generated usage data or the determined resource category allocation, executing allocation engines to allocate remaining unallocated computer resources, and providing a predicted resource allocation to implement the allocating of the computer resource.

Certain embodiments disclosed herein also include a non-transitory computer readable medium having stored thereon causing a processing circuitry to execute a process, the process includes generating a resource allocation policy defined for an organization for allocating the computer resources, determining a resource category allocation based on the generated resource allocation policy, generating a usage data, allocating the computer resource based on at least one of the generated usage data or the determined resource category allocation, executing allocation engines to allocate remaining unallocated computer resources, and providing a predicted resource allocation to implement the allocating of the computer resource.

Certain embodiments disclosed herein also include a system for allocating computer resources. The system comprises: a processing circuitry; and a memory, the memory containing instructions that, when executed by the processing circuitry, configure the system to generate a resource allocation policy defined for an organization for allocating the computer resources, determine a resource category allocation based on the generated resource allocation policy, generate a usage data, allocate the computer resource based on at least one of the generated usage data or the determined resource category allocation, execute allocation engines to allocate remaining unallocated computer resources, and provide a predicted resource allocation to implement the allocating of the computer resource.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Also, the present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

The various disclosed embodiments include a method and system for enabling accurate and efficient computer-based resource allocation with an incomplete policy (e.g., cloud computing resource allocation, such as processing time, storage space, and/or the like). Various embodiments utilize a hybrid rule-based and model-based (e.g., machine-learning model-based) configuration for allocating computer-based resources (e.g., embodiments may be configured to automatically determine weights by using a rule-based allocation and model-based allocation based on automatically generated data and/or user input data).

Allocations of computer-based resources may be determined based at least in part on one or more sets of category hierarchy from a defined policy or rule, coming either from the internal organization or generalized from data in external organizations. A complete policy fully allocates all the resources of a particular client/entity/user/organization. However, organization resource allocation policies are often incomplete due at least in part on misconfigurations of the policy and/or missing data from the policy. Indeed, complete policies are often impossible to generate, as the potential recipients of resource allocations is generally transient for many organizations (e.g., teams/budgets are often generated and/or deleted), and because certain potential recipients of resource allocations may collaborate on the usage of various resources for short periods of time (e.g., short, discrete length projects) with inter-recipient agreements on how those resources should be allocated.

In implementations where resources are abundant, manual labor that may be utilized to allocate otherwise unallocated resources can be very expensive. Moreover, the type of data relevant for automatically allocated resources versus unallocated resources may be vastly different (e.g., the feature space utilized for automatically allocating resources may be vastly different from the feature space utilized for estimating allocations of otherwise unallocated resources), which requires additional feature matching methodology. Existing industry application used a rule-based approach which requires excessive, subjective allocation based on human knowledge. Therefore, the methods and systems discussed herein facilitate accurate and efficient resource allocation possible, even for large scale resource usage.

Computing Entities

Embodiments of the present disclosure may be implemented in various ways, including as computer program products that include articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component including assembly language instructions may require conversion into executable machine code by an assembler prior to execution by the hardware architecture and/or platform. Another example of a programming language may be a higher-level programming language that may be portable across multiple architectures. A software component including higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component including instructions in one of the foregoing examples of programming languages may be executed directly by an operating system or other software component without having to be first transformed into another form. A software component may be stored as a file or other data storage construct. Software components of a similar type, or functionally related, may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, memory sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that includes a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as used herein, the term 'circuitry' refers to: (a) hardware-only circuit implementations (e.g., implementations in analog circuitry and/or digital circuitry); (b) combinations of circuits and computer program product(s) including software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation including one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Exemplary System Architecture

Figure 1:
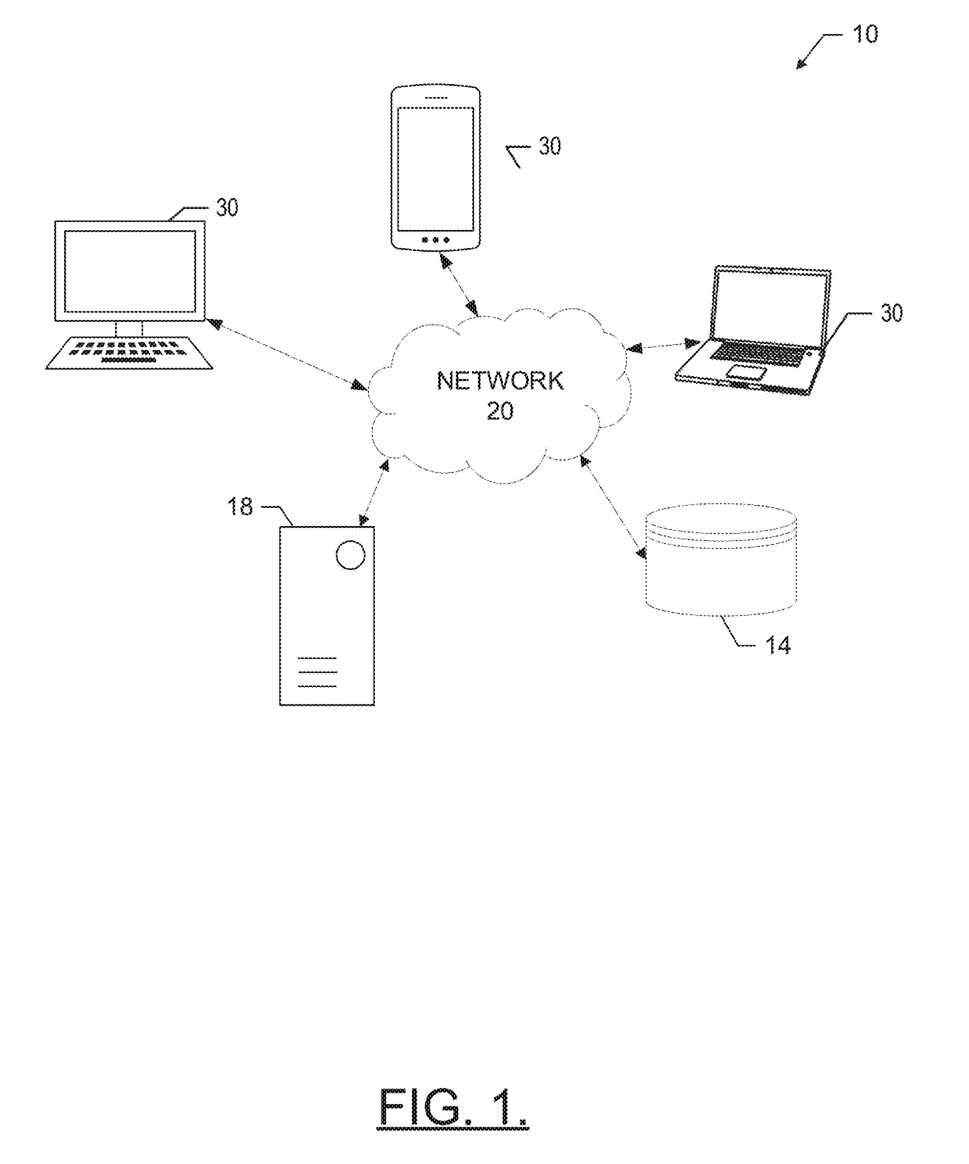
FIG. 1 is a basic block diagram illustrating a system for allocating computer-based resources, according to various exemplary embodiments.

FIG. 1 is a basic block diagram illustrating a system 10 for allocating computer-based resources, according to various exemplary embodiments. As shown and described herein, the system 10 could be employed in the context of a network 20 over which numerous electronic devices may communicate via wired, wireless, or a combination of wired and wireless communication mechanisms. In an exemplary embodiment, the electronic devices may be embodied as personal computers (PCs), handheld devices (e.g., smartphones) or other terminals that may enable individuals to run applications and/or communicate with each other in accordance with embodiments of the present disclosure. In this regard, the system 10 may include a number of different electronic devices, each of which may include any device or means embodied in either hardware, software, or a combination of hardware and software configured to perform one or more functions, including those attributed to the respective devices as described herein.

Exemplary Server

Figure 2A:
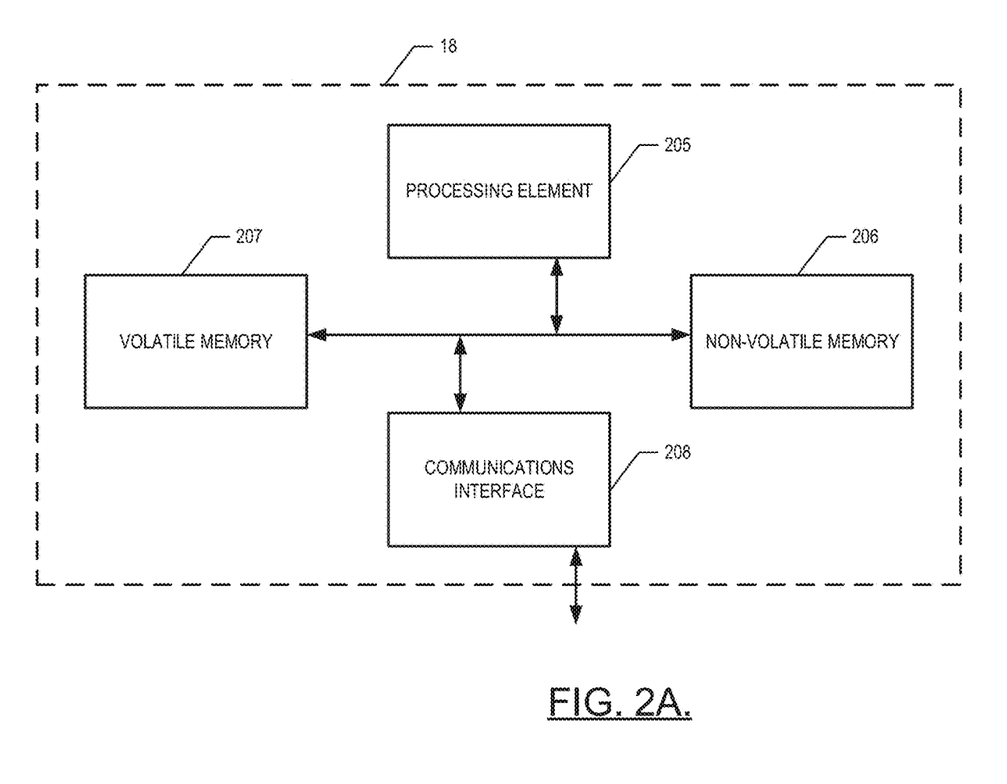
FIG. 2A is a schematic diagram of a server, according to an embodiment.

The server 18 may be a server or other computing platform including memory and processing capability (e.g., the volatile memory 207 and the processing element 205 of FIG. 2A) and in communication with the network 20 in order to facilitate operation in accordance with embodiments of the present disclosure.

FIG. 2A is a schematic diagram of a server 18, according to an embodiment. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the server 18 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the server 18 may communicate with other computing entities, such as one or more user computing entities 30, and/or the like.

As shown in FIG. 2A, in one embodiment, the server 18 may include or be in communication with one or more processing elements 205 (also referred to as processors, processing circuitry, and/or similar terms used herein interchangeably) that communicate with other elements within the server 18 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

As will be understood, the processing element 205 may be embodied as a plurality of processing elements (e.g., processing elements of respective server blades) that may be collectively configured to provide variable processing resources to particular tasks. For example, the server 18 may be embodied as a cloud-based storage and/or processing system, for which processing and/or storage resources may be allocated to particular users on an as-needed and/or as-reserved basis. As just one non-limiting embodiment, a cloud-based server system may be configured for providing processing resources to particular client-entities (e.g., processor time to accomplish particular computing tasks, storage space to store data, retained processor time to be made available to the client-entity for usage if/when needed, and/or the like). As discussed herein, the server 18 may be configured for monitoring usage of processing resources by various users/clients, such that the operator of the processing resources may bill users/clients based on usage of the processing resources of the server 18.

In one embodiment, the server 18 may further include or be in communication with non-volatile media (also referred to as non-volatile storage, memory, memory storage, memory circuitry and/or similar terms used herein interchangeably). As one example illustrated in FIG. 1, the server 18 may be in communication with a separate database 14 (e.g., a non-volatile database storage or memory) that may be made available for storing user/client data thereon (e.g., in exchange for a fee). However, it should be understood that the database 14 may be a part of the server 18 in various embodiments. In one embodiment, the non-volatile storage or memory may include one or more non-volatile storage or memory media 206 as described above, such as hard disks, ROM, PROM, EPROM, EEPROM, flash memory, MMCs, SD memory cards, memory sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers (as shown in FIG. 1), or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only.

Memory media 206 may include information/data accessed and stored by the server 18 to facilitate the operations of the server 18. More specifically, memory media 206 may encompass one or more data stores configured to store information/data usable in certain embodiments. As displayed in one example, those one or more data stores may be segregated based on associated users/clients. For example, a first data store may correspond to a first client, and a second data store may correspond to a second client. In such embodiments, data may not be passed directly between data stores, even if those data stores exist even partially within shared hardware components.

Figure 2B:
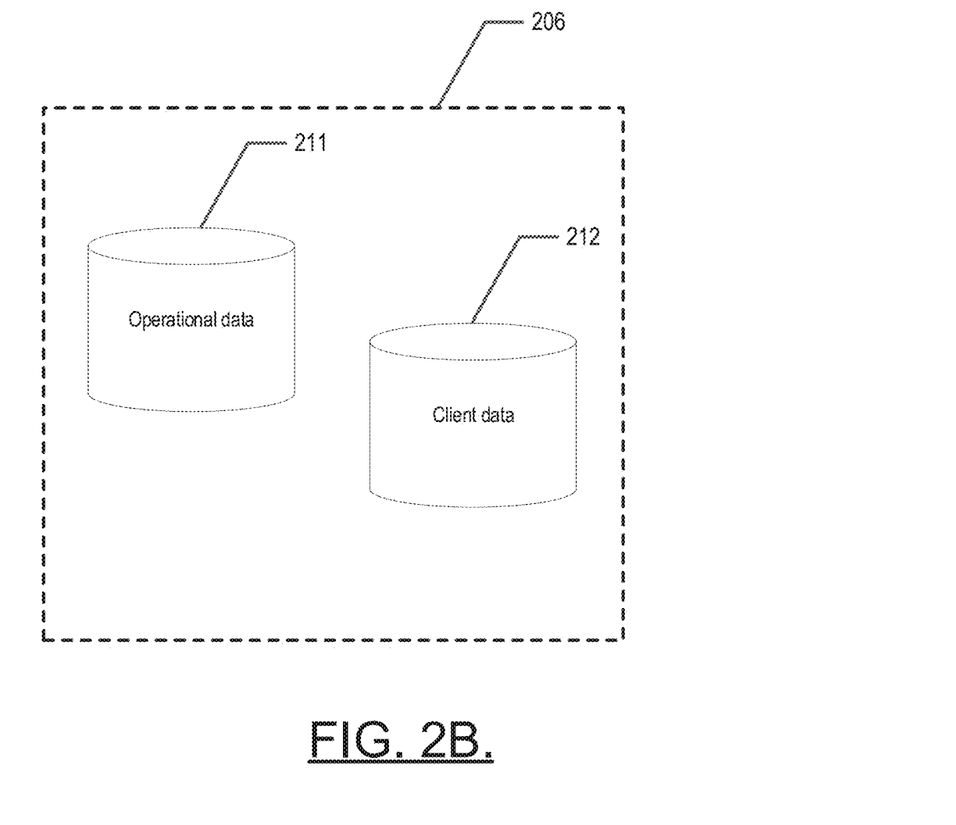
FIG. 2B is a schematic diagram of a memory media, according to an embodiment.

FIG. 2B is a schematic diagram of a memory media 206, according to an embodiment. As illustrated in FIG. 2B, the memory media 206 may include operational data 211, which may encompass executable programs for executing various configurations as discussed herein. The memory media 206 may additionally include client data 212, which may encompass one or more client-specific data stores (as discussed herein). Although illustrated as existing within a single memory media 206, it should be understood that the operational data 211 and the client data 212 may exist within separate memory media 206 (which may be geographically and/or electronically separated). As just one example, the operations data 211 may be accessible by a first server 18 configuration, and the client data 212 may be accessible by a second server 18 configuration.

In one embodiment, the server 18 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2

SDRAM, DDR3 SDRAM, RDRAM, RIMM, DIMM, SIMM, VRAM, cache memory, register memory, and/or the like. As will be recognized, the volatile storage or memory media may be used to store, at least, portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the server 18 with the assistance of the processing element 205 and operating system.

As indicated, in one embodiment, the server 18 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the server 18 may communicate with computing entities or communication interfaces of other servers, terminals, and/or other computing entities.

As indicated, in one embodiment, the server 18 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the server 18 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The server 18 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Conges- tion Control Protocol (DCCP), Stream Control Transmission Protocol (SCTP), HyperText Markup Language (HTML), and/or the like.

As will be appreciated, one or more of the server 18 components may be located remotely from other server 18 components, such as in a distributed system. Furthermore, one or more of the components may be aggregated and additional components performing functions described herein may be included in the server 18. Thus, the server 18 can be adapted to accommodate a variety of needs and circumstances.

Exemplary User Computing Entity

Figure 3:
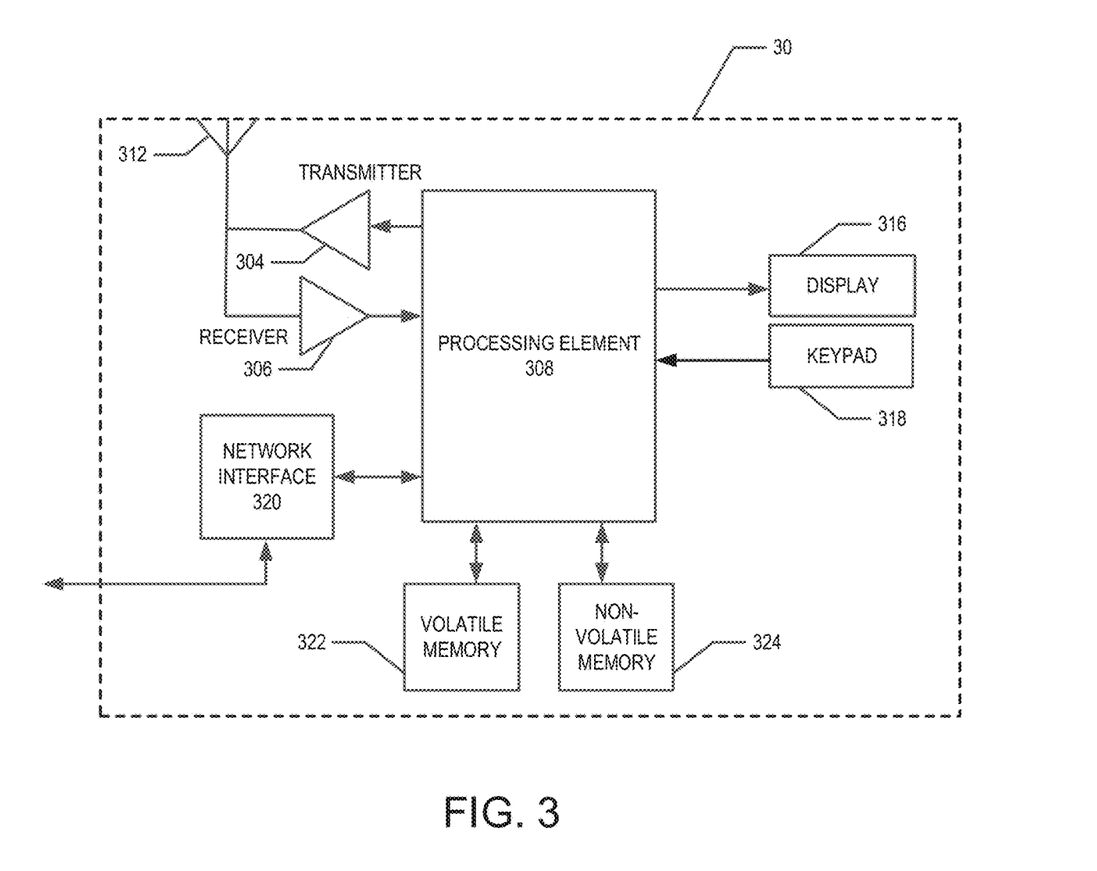
FIG. 3 is an illustrative schematic representative of user computing entity usable with various embodiments.

FIG. 3 is an illustrative schematic representative of user computing entity 30 usable with various embodiments. As will be recognized, the user computing entity may be operated by a user/agent and include components and features similar to those described in conjunction with the server 18. Further, as shown in FIG. 3, the user computing entity may include additional components and features. For example, the user computing entity 30 can include an antenna 312, a transmitter 304 (e.g., radio), a receiver 306 (e.g., radio), a network interface 320, and a processing element 308 that provides signals to and receives signals from the transmitter 304 and receiver 306, respectively, and/or the network interface 320. The signals provided to and received from the transmitter 304 and the receiver 306, respectively, may include signaling information/data in accordance with an air interface standard of applicable wireless systems to communicate with various entities, such as server 18, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wired or wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO (Low Earth Orbit) satellite systems, DOD (Department of Defense) satellite systems, the European Union Galileo positioning systems, the Chinese Compass navigation systems, Indian Regional Navigational satellite systems, and/or the like. Alternatively, the location information/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID (Radio Frequency Identification) tags, indoor beacons or transmitters, Wi-Fi access points, cellular towers, nearby computing devices (e.g., smartphones, laptops) and/or the like. For instance, such technologies may include iBeacons, Gimbal proximity beacons, BLE (Bluetooth Low Energy) transmitters, Near Field Communication (NFC) transmitters, and/or the like. These indoor positioning aspects can be used in a variety of settings to determine the location of someone or something to within inches or centimeters.

The user computing entity 30 may also include a user interface including one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the server 18. The user input interface can include any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, memory sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

Exemplary Networks

In one embodiment, a network 20 may include, but is not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the network 20 may have any suitable communication range associated therewith and may include, for example, global networks (e.g., the Internet), MANs, WANs, LANs, or PANs. In addition, the network 20 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Exemplary System Operation

Figure 4:
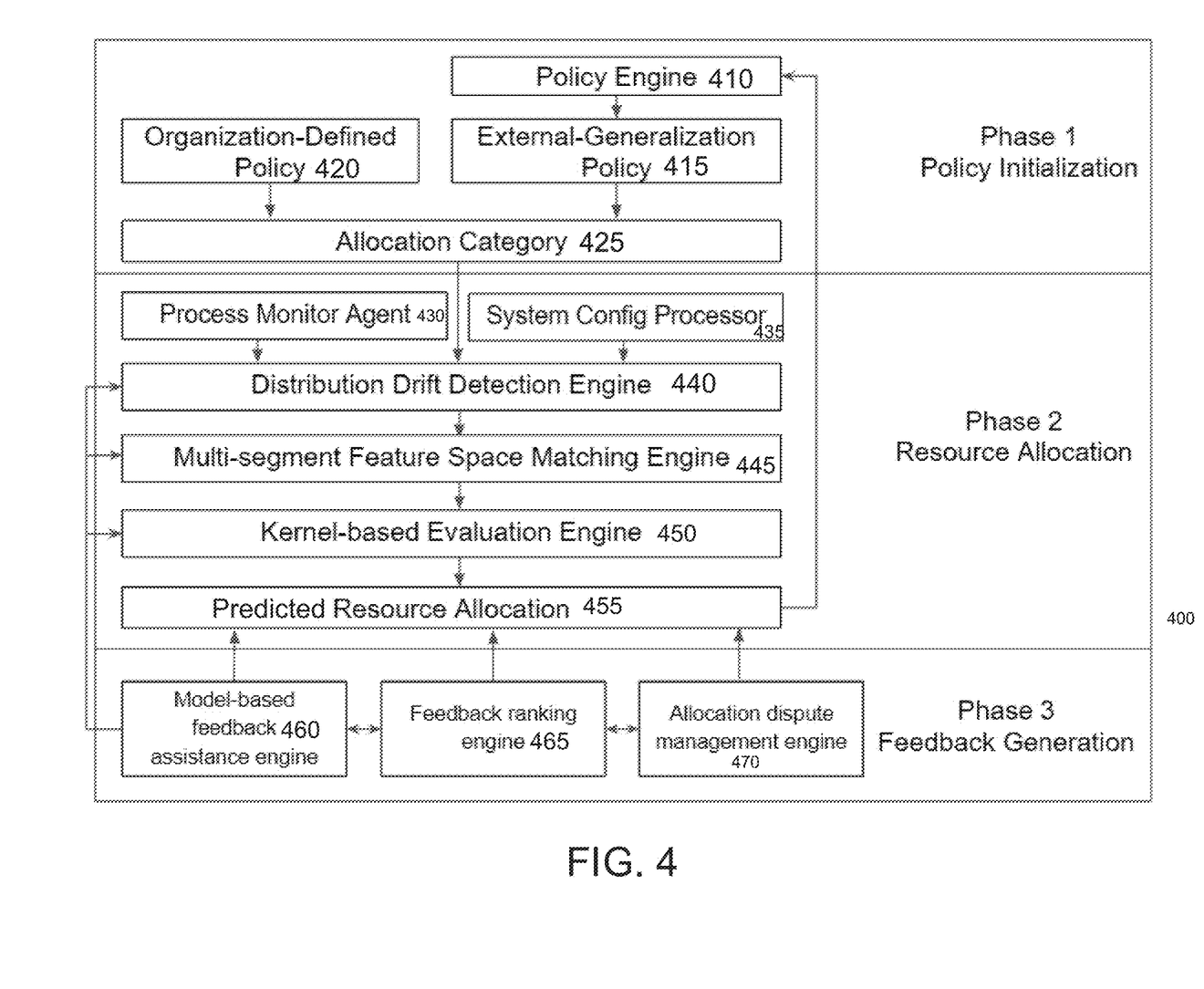
FIG. 4 is a flow diagram showing various components/methods associated with generating a resource allocation based on incomplete policy, according to an embodiment.

FIG. 4, is a flow diagram 400 showing various components/methods associated with generating a resource allocation based on incomplete policy, according to an embodiment. A policy may be generated internally for a particular organization, or a policy may be established externally to a particular organization. As another non-limiting example, a policy may include an industry-standard policy, a sample policy generated by another organization, and/or the like. The policy sets forth particular resources, which are to be allocated, and such policies may generally focus on the allocation of computer-based resources to established teams/budgets. The policy may further include general principles for allocating resources to ephemeral teams/budgets, to cross-functional teams, and/or the like. However, these policies generally cannot (and do not attempt to) address each and every particular scenario that may impact how particular resources are to be allocated. Thus, while certain ongoing resource usages may be easily allocated to particular teams (e.g., hosting of a shopping-cart system for an e-commerce retailer may be subject to an established allocation that computer-based resources for this service are to be billed against a "sales" budget). Bespoke projects, newly established processes, and/or the like may be more difficult to categorize based on a slow-changing policy (e.g., processing time associated with performing a one-time market analysis of all e-commerce orders that were executed during a "grand re-opening" sale time period may not easily be categorized as a "sales" or "marketing" or "data science" activity based on an established policy).

To generate a resource allocation based on a policy, a Full Cost Allocation (FCA) is conducted within a cloud spending domain. In an embodiment, three phases are implemented, as will be explained in more detail below.

In phase 1, an initial resource category allocation is generated (i.e. cost buckets, or categories are determined), and direct costs are assigned to these determined bucket or categories. Here, direct cost include costs or resource allocation that is definitively known as belonging to a particular bucket or category. Also, during phase 1, indirect and shared costs, where costs are spread proportionally among buckets based on certain percentages or metrics are determined.

In phase 2, costs that were unable to be categorized in phase 1 may further be processed. The costs may include direct costs that was unable to be properly categorized in phase 1, or indirect/shared costs that do not have rules or particular rules to allocate the costs. In this case, heuristics and a variety of techniques implemented by engines are used to generate a set of candidate allocations for distributing these costs.

In phase 3, feedback is gathered and assessed, and a model that improves allocation of the costs may be generated.

Details of the above-described phases will be elaborated below.

Phase 1: Policy Initialization

The purpose of this phase is to gather and determine an initial resource category allocation 425 via policy, which may be a representation of an organization's cost when viewed from a particular vantage point, as defined by the particular organization or generalized from external organizations. As shown in FIG. 4, a policy engine 410 may be utilized to generate (and/or modify) a resource category allocation policy for a particular organization. The policy engine 410 may be utilized to generate a bespoke policy for the organization, beginning from scratch, or the policy engine 410 may be configured to integrate an externally-generalized policy 415 (e.g., which may be built automatically, for example, via machine-learning algorithms) based at least in part on resource category allocation policies of other organizations. Examples of externally-generated policy 415 may include those that are based on cloud management objects hierarchy, (e.g., using AWS Organizations API and AWS Account Numbers) as a way to bucketize (or categorize the costs); those that are based on cloud resource organizing hierarchy (e.g., using Azure Resource Groups or using VPCs/ALBs/Cluster Names as organizing entities); and those that are based on pre-built template (e.g., SaaS provider, SMB business, etc.) that are then customized.

As should be understood, the policy engine 410 may be executable via the server 18 (e.g., a server 18 associated with a policy integration entity) and may be accessible via one or more graphical user interfaces, terminal interfaces, and/or the like displayable via user computing entities 30, thereby enabling users to customize the policy to be generated, modified, and/or integrated for determining the resource category allocation 425.

When generating a policy based at least in part on policies of other organizations (i.e., the external-generalization policy 415), or an organization-defined policy 420 (e.g., generating, through a machine-learning algorithm, a policy for a particular organization based at least in part on resource category allocation policies of other organizations), the policy engine 410 may be configured to receive data indicative of various aspects of a particular organization, such as the number and/or types of teams, the size of budgets associated with each team, the number of sub-teams associated with each team, the names of each team, how teams are identified (e.g., at least some teams may be identified based on commonly identified terms and/or commonly identified concepts within particular resource names), and/or the like. Based at least in part on such data collected for a particular organization, the policy engine 410 may then determine particular characteristics of policy models of other teams, such as the number and/or types of features utilized for classifying data within teams, the frequency with which classifications are deemed effective for teams, and/or the like. Such characteristics may be utilized to construct a policy for an organization, which may then be modified (e.g., automatically and/or based at least in part on user input, for example, of an administrative user associated with the organization).

The policy generated by the policy engine 410 may be stored in executable form, for example, within a memory storage database accessible to the server 18 and/or via a user interface (e.g., at least temporarily). Policies may be provided in any of a variety of formats and may include any of a variety of data. For example, policies may directly allocate particular resources (e.g., identified based at least in part on a resource identifier) to particular recipients (e.g., a budget identified by a budget identifier). As another example, a policy may provide more generalized allocations, such as threshold-based allocations (e.g., resource usage above a threshold amount should be allocated to a particular recipient), metric-based allocations (e.g., storage resources may be allocated based on storage-usage (e.g. gigabytes) to recipients, compute resources may be allocated based on computation time (e.g. instance hours) to recipients, and/or the like). It should be understood that any of a variety of allocations may be implemented.

Moreover, as noted above, policies may be modified (e.g., manually and/or automatically) via the policy engine 410. For example, as an organization is restructured, as new computer-resources are utilized, as new recipients are generated, and/or the like, one or more established policies may be modified to update resource category allocation policies to address any changes to the organization.

Ultimately, one or more policies of an organization may be implemented to allocate at least a portion of resources utilized by the organization. As discussed in greater detail herein, usage data may be generated and/or collected by a process monitoring agent 430 (executing within computational resources associated with an organization and/or otherwise executing with access to resource usage and/or utilization data) and, based on the usage data, resources that may be allocated based on the one or more policies of the organization may be allocated in accordance with the policies. Any remaining computer-based resources may then be considered unallocated and may be allocated in accordance with various embodiments as discussed herein.

Phase 2: Resource Allocation

As noted above, various embodiments are configured to allocate resources based at least in part on allocation categories 425 defined at least in part by the policy engine 410 discussed above. An resource allocation 455 performed in phase 2 is based at least in part on one or more of: usage data generated and/or collected by a process monitoring agent 430 that is executed at a client's resources, data provided by a computer resource provider(s) (e.g., a cloud computing provider), and/or the like. The process monitoring agent 430 is configured to collect usage data metrics, and provide the usage data metrics back to a server 18. The server 18 then executes applicable resource allocation engines to generate a resource allocation 455 encompassing both allocated resources (allocated in accordance with a policy) and unallocated resources.

In various embodiments, the process monitoring agent 430 may be configured for execution within a container-based environment that may be rolled-out within a client/organizations computing resources with limits on data collection (thereby preventing the process monitoring agent 430 from collecting confidential or otherwise substantive data generated and/or utilized by the organization), such that the process monitoring agent 430 retains sufficient access to usage data of the organization's resources without other additional data access.

In certain embodiments, the usage data generated and/or collected by the process monitoring agent 430 includes data indicative of a plurality of features corresponding to various resource usages. These features may be indicative of characteristics of the resources used, time stamps associated with resource usage, quantity of resource used (in applicable units, such as processing time, storage units, and/or the like), tags associated with the resource usage (e.g., tags provided by users of the resources, which may be indicative of a purpose, team, and/or the like associated with the resource usage), user identifiers associated with resource usage (e.g., unique user identifiers, which may be user-selected, or may be user computing entity 30 specific, such as an IP address associated with a particular user, and/or the like), inter-resource interactions (e.g., communications among computation servers, storage/databases, asynchronized processes, API (application program interface) calls, and/or the like), relationships among resources (e.g., autoscaling resources), security access groups (e.g., identity and access management), and/or the like. It should be understood that any number and/or types of features may be collected in accordance with various embodiments. Moreover, it should be understood that the type of features collected may differ among different resources. Accordingly, the type of features available may itself be considered a feature that may be usable in various embodiments to categorize an otherwise unallocated resource.

In an embodiment, the process monitoring agent 430 collects metrics for a container orchestration system, which is more specifically a virtualization management system that abstracts computer, network, or storage resources and self-schedules and allocates resources. Also, the processing monitoring agent 430 implements a policy that collects data metrics from an associated metrics database regarding performance and system utilization of a particular system, and virtualized resources running on the system.

The data metrics collected can then be used to generate an allocation defining how to split or allocate the costs associated with the particular types of resource. In this case, there are heuristics and rules about how the costs should be allocated, such as using cluster names, namespaces, docker labels, annotations, etc. That is, there are rules about how much memory or how much processor resources should be weighted and contribute to a certain percentage of cost, as well as certain network and storage costs to be considered. Not all the resources from the process monitor agent 430 may be attributable. Therefore, other techniques may be used to determine the allocation of costs.

In various embodiments, a system configuration processor 435, which is a software that automatically collects and configures system configuration (e.g. at application level), operates to execute allocation engines. Here, the system configuration processor 435 is configured to execute a Multi-Segment Feature Matching (MSFM) engine 445 to allocate otherwise unallocated resources. The MSFM engine 445, which is a segmentation-based feature detection algorithm that detects changes and drifts in the key input over time, includes a machine-learning algorithm configured to solve the challenges of feature space mismatch among labeled resources and unlabeled resources using feature detection. That is, feature detection attempts to isolate key factors that influence inputs when the output is known, which is part of supervised learning. Using statistical and ML-based techniques, inconsistencies may be detected by the MSFM engine 445. In certain embodiments, the resource allocation may be configured to address any distribution drift within the system, which may be detected by a distribution drift detection engine 440.

In certain embodiments, the system configuration processor 435 is configured to execute separate MSFM engines 445 for each of a plurality of organizations. In certain embodiments, the system configuration processor 435 may be configured to utilize a common model structure (e.g., using a common machine-learning technique, such as a naïve model) for a plurality of organizations. However, the training data utilized to train the model may be different for each organization. Thus, each organization may have a unique model associated for each organization, with each unique model being generated according to a common model structure.

In certain embodiments, the MSFM engine 445 may utilize a feature matching technique to transform the original dataset to a new feature space, where the projected allocated resources and unallocated resources cannot be distinguished from each other. A model-based architecture (e.g., a Neural Network) may be adopted to find deep features that are discriminative for a main learning task on the labeled/tagged data, and are also invariant with respect to the covariate shift between allocated and unallocated resource distributions. In certain embodiments, a model-based classifier (e.g., a machine-learning based classifier) can be trained on the allocated resources in this domain-invariant feature space, which may then generate a predicted allocation for unallocated resources.

The accuracy of the proposed model may be evaluated with a Kernel based model selection technique, on a kernel-based evaluation engine 450, even without known true tags of the untagged resources. The Kernel-based method estimates importance weights of the tagged data in order to reduce the distribution difference between tagged and untagged data (i.e. labeled or unlabeled data). Characteristics such as a tag are identified as a feature and may be evaluated. Tagged data points with large weights may have a similar marginal distribution to the untagged data. Therefore, a validation set may be created by sampling tagged data points with high importance weights. The performance of the proposed model can be tested/fine-tuned on the validation set.

In certain circumstances, extreme covariance shifts may exist in some of the unallocated resources, which may decrease the reliability of the feature matching results. A similar technique based on a Kernel-based method can be used to detect unallocated resources which are far away from the distribution of allocated resources. Based on the importance weights of the untagged data with respect to the tagged data, unallocated resources with near-zero values may be identified as an extreme covariance and can be filtered out from the original dataset.

Figure 5:
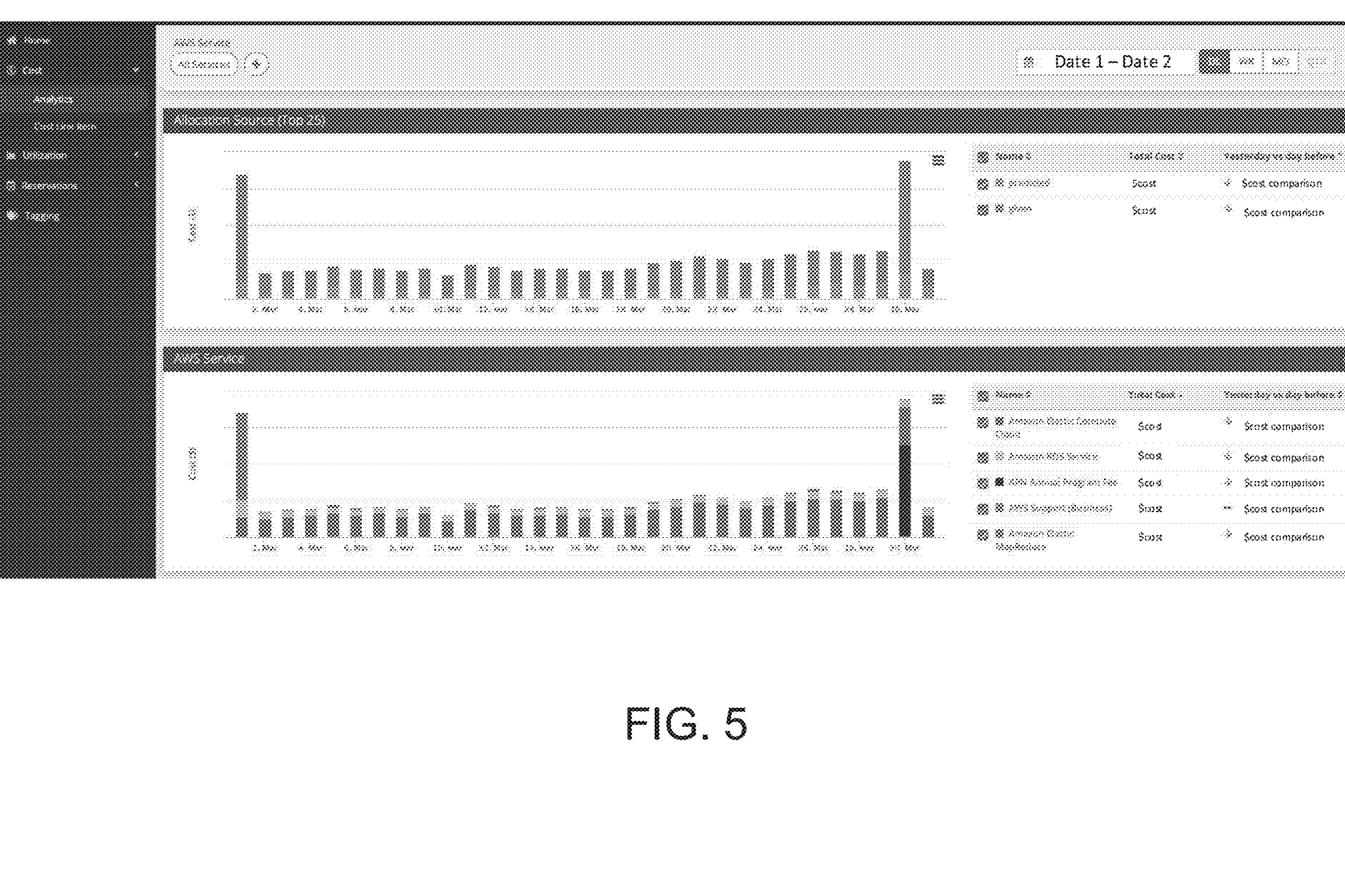
FIG. 5 is graphical user interface screens showing cost allocation over a given period of time, according to an embodiment.
Figure 6:
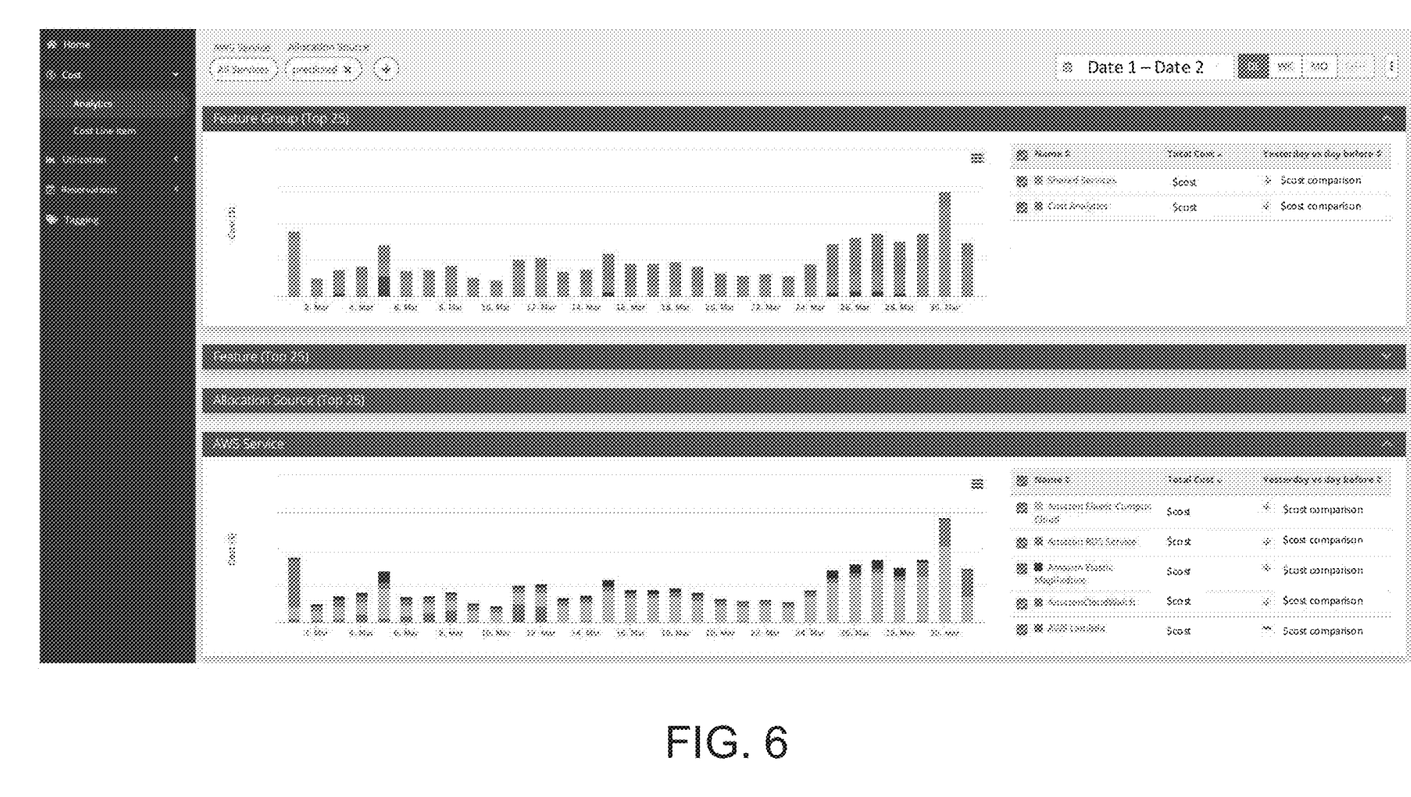
FIG. 6 is graphical user interface screens showing cost allocation over a given period of time, according to an embodiment.

Additionally, a predicted resource allocation 455 may be provided to an appropriate computing entity associated with the organization, to implement the resource allocation. For example, the server 18 generating a predicted resource allocation 455 may be configured to generate a graphical user interface accessible to users via user computing entities 30 which graphically depicts the predicted resource allocation 455. Example graphical user interface screens are provided at FIGS. 5 and 6, showing allocation sources, services to which computer resources are allocated, feature groups monitored, and AWS services to which computer resources are allocated over a time period In more detail, FIGS. 5 and 6 depict graphical user interface screens showing cost allocation over a given period of time. FIG. 5 aggregates both directly attributed (given)

and predicted costs and breaks down by Allocation Source and AWS Service. FIG. 6. depicts a similar view but is filtered by allocation source. Here, only predicted costs is included, and the collection of costs by the dimensions of Feature Group and AWS Service are highlighted. Users may then utilize the predicted resource allocation 455 to allocate bills to various budgets, and/or the like. In other embodiments, an organization may utilize an allocation engine (not shown) to automatically allocate resources based on allocation data. Thus, the predicted resource allocation 455 generated by the MSFM engine 445 may be provided to the organization's allocation engine (not shown), which may automatically allocate resources in accordance with the predicted resource allocation 455. Even in embodiments in which an organization utilizes an allocation engine, the server 18 may provide a graphical user interface that may be utilized by users to view data indicative of the predicted resource allocation 455 generated by the MSFM engine 445. For example, the server 18 may utilize such a graphical user interface to request and/or to collect feedback indicative of the effectiveness of the resource allocation (which may be utilized to update models, training data, and/or the like to increase the effectiveness of the models utilized by the MSFM engine 445 to generate predicted resource allocations 455).

Phase 3: Feedback Generation

The above-described engines 435-450 work together to detect mismatches. To correct for the detected mismatches, organization and context dependent techniques may be applied through a feedback loop and an assistance engine. Here, various embodiments may be configured to collect feedback from end users (e.g., via user input provided via graphical user interfaces presented to users via user computing entities 30). The feedback provided, which may be from a model-based feedback assistance engine 460, a feedback ranking engine 465, and an allocation dispute management engine 470 may be incorporated into the machine-learning models. In an embodiment the feedback may be utilized as training data, may indicate which allocations received positive feedback, may identify correct allocations for purposes of the training data. Conversely, the feedback may indicate which allocations received negative feedback, or may identify an incorrect allocation for purposes of training data. This feedback is thus utilized to refine the models and/or to manage potential disagreements that may arise between potential allocations.

In an embodiment, phase 3 may be a feedback collection and generation phase whereby both machine learning model-generated and user-based input is collected and re-inserted into the earlier phases of the overall process as inputs in order to optimize and improve future output.

The model-based feedback assistance engine 460 uses machine learning algorithms to assist users in comparing the overall accuracy of predicted resource allocations. This task is exceptionally difficult when the complexity of an organization grows or the number of resources increases (e.g. into the millions). This engine is able to generate metadata and other statistics and show the models' relative performance over time. This helps the user evaluate and provide feedback about the merits of the various models. This supervised learning input can then be used in subsequent iterations.

The feedback ranking engine 465 maintains and keeps track of user-based feedback on predicted resource allocations at a granular level. If output from resource allocations do not appear to be correct (or should be marked for review), the feedback ranking engine will keep track and ensure that the positive, negative, neutral and review feedback is taken into account in subsequent iterations.

The allocation dispute management engine 470 can be used to resolve potential business rule conflicts of misalignments that may arise due to conflicts between rule sets such as tagging and labeling that doesn't comply with assigned buckets and segment feature assignments which may have drifted and been auto-assigned by the system.

In some embodiments, these engines may work together to provide a holistic approach to ranking, providing feedback and improving resource allocation over time.

Figure 7:
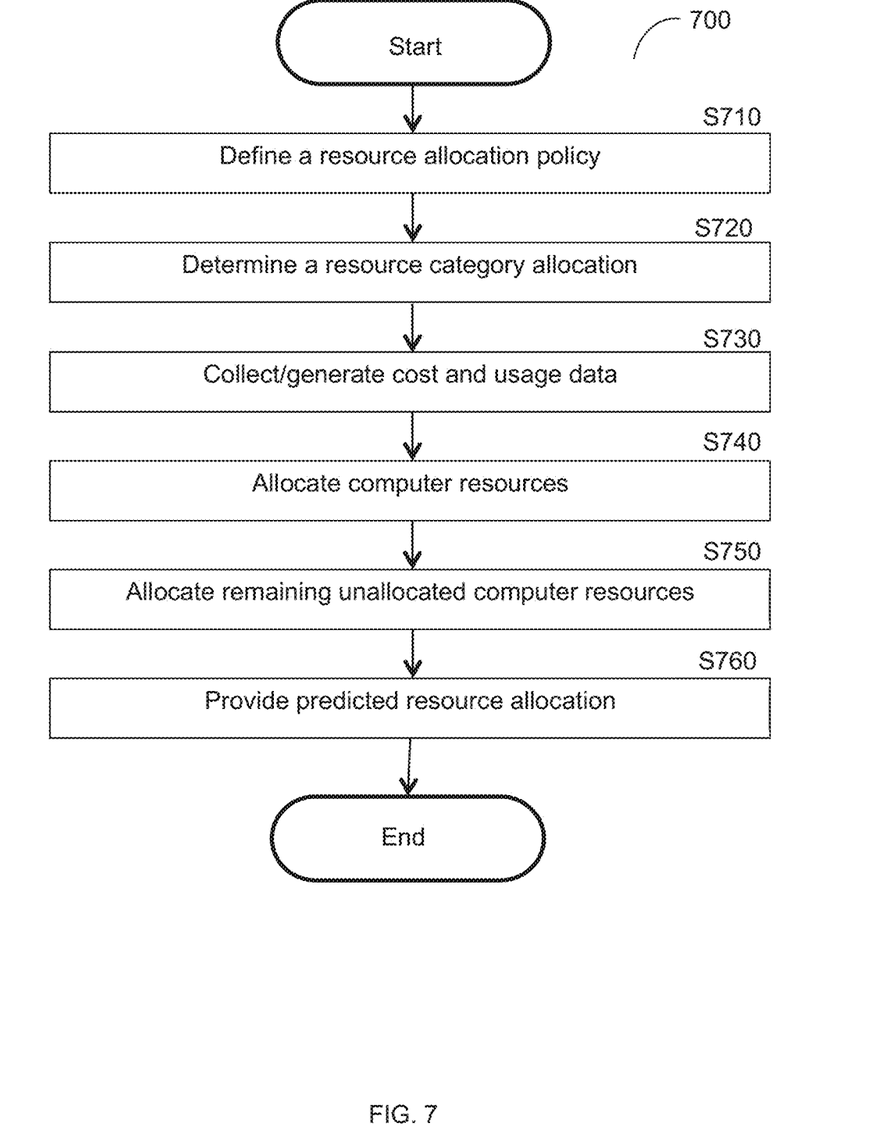
FIG. 7 shows a flowchart of a method of for allocating computer resources, according to an embodiment.

FIG. 7 shows a flowchart 700 of a method of for allocating computer resources, according to an embodiment. The method may be carried out by, for example, the processing element 205 within the server 18, within the processing element 308 within the computing entity 30. At S710, a resource allocation policy is defined for an organization for allocating the computer resources is generated. Then, at S720, a resource category allocation allocation is determined based on the generated resource allocation policy. Afterwards, at S730 a cost and usage data is collected and generated (as required). Next, at S740, the computer resources are allocated based on at least one of the resource category allocation or the resource category allocation other organization allocation policies in effect. Then, at S750, allocation engines are executed to generate candidate allocations for the remaining unallocated computer resources. Afterwards, at S760, the best predicted resource allocation is provided to implement the allocating of the computer resources.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although the foregoing description indicates that the MSFM engine 445 is executed at a server configured away from the organization's resources, it should be understood that in alternative embodiments, a model may be installed (e.g., within a container, such as a Kubernetes-based container) at a client's resources, for local execution and maintenance of resource allocation configurations. Such embodiments may not be influenced by models of other organizations, and similarly, usage data may not be transmitted out of the organization's resources, to minimize potential data leaks from the organization's resources.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for allocating computer resources, comprising:
   generating a resource allocation policy defined for an organization for allocating the computer resources;
   determining a resource category allocation based on the generated resource allocation policy;
   generating a usage data;
   automatically generating, by a machine learning model, a new predicted resource allocation policy based on at least one of the generated usage data or the determined resource category allocation, the generating including:
      detecting drifts in key application to the computer resources that is input over time, isolating factors that influence the key application based on a known output including total expenditure of the keyed computer resources and unkeyed computer resources, and transforming the usage data to a new feature space,
   executing allocation engines to allocate remaining unallocated computer resources;
   automatically providing a predicted resource allocation based on the new predicted resource allocation policy to implement a reallocation of the computer resources;
   refining the machine learning model by generated feedback, wherein the generated feedback indicates one of an allocation that received a specific feedback, or an identified correct allocation of the computer resources;
   reallocate the remaining unallocated resources based on the generated feedback and a feature matching technique.

2. The method of claim 1, wherein the organization includes one of an external or an internal organization.

3. The method of claim 1, wherein the resource allocation policy is generated by receiving data indicative of an aspect of the organization.

4. The method of claim 1, wherein the usage data includes a plurality of features, the plurality of features including one of characteristics of the computer resources used, time stamp, quantity of the computer resources used, tags associated with the use of the computer resources, user identifiers associated with the use of the computer resources, inter-resource interactions, Application Program Interface (API) calls, relationships among the computer resources, or security access groups.

5. The method of claim 1, further comprising detecting the remaining unallocated computer resources using a kernel-based method.

6. The method of claim 1, wherein the feedback is provided by one of a model-based feedback assistance engine or an allocation dispute management engine.

7. The method of claim 1, further comprising generating a feedback, wherein the feedback is generated by one of a model-based feedback assistance engine or an allocation dispute management engine.

8. A non-transitory computer readable medium having stored thereon instructions for causing a processing circuitry to execute a process, the process comprising:
   generating a resource allocation policy defined for an organization for allocating computer resources;
   determining a resource category allocation based on the generated resource allocation policy;
   generating a usage data;
   automatically generating, by a machine learning model, a new predicted resource allocation policy automatically based on at least one of the generated usage data or the determined resource category allocation, the generating including:
      detecting drifts in key application to the computer resources that is input over time,
      isolating factors that influence the key application based on a known output including total expenditure of the keyed computer resources and unkeyed computer resources, and
      transforming the usage data to a new feature space;
   executing allocation engines to allocate remaining unallocated computer resources; and
   automatically providing a predicted resource allocation based on the new predicted resource allocation policy to implement a reallocation of the computer resources automatically;
   refining the machine learning model by generated feedback, wherein the generated feedback indicates one of an allocation that received a specific feedback, or an identified correct allocation of the computer resources;

reallocate the remaining unallocated resources based on the generated feedback and a feature matching technique.

9. A system for allocating computer resources, comprising:
- a processing circuitry; and
- a memory, the memory containing instructions that, when executed by the processing circuitry, configure the system to:
- generate a resource allocation policy defined for an organization for allocating the computer resources;
- determine a resource category allocation based on the generated resource allocation policy;
- generate a usage data;
- automatically generate, by a machine learning model, a new predicted resource allocation policy automatically based on at least one of the generated usage data or the determined resource category allocation, the generating including:
  - detecting drifts in key application to the computer resources that is input over time,
  - isolating factors that influence the key application based on a known output including total expenditure of the keyed computer resources and unkeyed computer resources, and
  - transforming the usage data to a new feature space;
- execute allocation engines to allocate remaining unallocated computer resources;
- and provide a predicted resource allocation based on the new predicted resource allocation policy to implement a reallocation of the computer resources automatically;
- refining the machine learning model by generated feedback, wherein the generated feedback indicates one of an allocation that received a specific feedback, or an identified correct allocation of the computer resources;
- reallocate the remaining unallocated resources based on the generated feedback and a feature matching technique.

10. The system of claim 9, wherein the organization includes one of an external or an internal organization.

11. The system of claim 9, wherein the resource allocation policy is generated by receiving data indicative of an aspect of the organization.

12. The system of claim 9, wherein the usage data includes a plurality of features, the plurality of features including one of characteristics of the computer resources used, time stamp, quantity of the computer resources used, tags associated with the use of the computer resources, user identifiers associated with the use of the computer resources, inter-resource interactions, Application Program Interface (API) calls, relationships among the computer resources, or security access groups.

13. The system of claim 9, wherein the system is further configured to detect the remaining unallocated computer resources using a kernel-based method.

14. The system of claim 9, wherein the feedback is provided by one of a model-based feedback assistance engine or an allocation dispute management engine.

15. The system of claim 9, further comprising generating a feedback, wherein the feedback is generated by one of a model-based feedback assistance engine or an allocation dispute management engine.

* * * * *